US009857014B2

(12) United States Patent
Carson et al.

(10) Patent No.: US 9,857,014 B2
(45) Date of Patent: Jan. 2, 2018

(54) INTERNAL RESTRAINT DEVICE

(71) Applicant: CAR-BER Investments Inc., Wallaceburg (CA)

(72) Inventors: Glenn Carson, Point Edward (CA); Graham T. Brown, Samia (CA)

(73) Assignee: Car-Ber Investments Inc., Wallaceburg (CA)

( * ) Notice: Subject to any disclaimer, the term of this patent is extended or adjusted under 35 U.S.C. 154(b) by 179 days.

(21) Appl. No.: 14/753,315

(22) Filed: Jun. 29, 2015

(65) Prior Publication Data

US 2015/0377403 A1 Dec. 31, 2015

Related U.S. Application Data

(60) Division of application No. 13/037,103, filed on Feb. 28, 2011, now abandoned, which is a continuation-in-part of application No. PCT/CA2009/001178, filed on Aug. 28, 2009.

(60) Provisional application No. 61/092,715, filed on Aug. 28, 2008.

(51) Int. Cl.
*F16L 55/10* (2006.01)
*F16L 55/128* (2006.01)
*F16L 55/136* (2006.01)

(52) U.S. Cl.
CPC ........... *F16L 55/128* (2013.01); *F16L 55/136* (2013.01)

(58) Field of Classification Search
CPC ...................................... F16L 55/128
USPC ...................................... 138/89, 90
See application file for complete search history.

(56) References Cited

U.S. PATENT DOCUMENTS

| | | | |
|---|---|---|---|
| 2,329,801 A | 9/1943 | Wellborn | |
| 2,375,995 A | 5/1945 | Kaeser | |
| 2,870,794 A | 1/1959 | Thaxton | |
| 3,886,977 A | 6/1975 | Dorgebray | |
| 3,986,383 A | 10/1976 | Petteys | |
| 4,267,401 A * | 5/1981 | Wilkinson | ........... H01B 17/308 174/151 |
| 4,381,800 A | 5/1983 | Leslie | |
| 4,463,938 A | 8/1984 | Deaman | |
| 4,760,868 A | 8/1988 | Saxon | |
| 4,854,384 A * | 8/1989 | Campbell | ........... F16L 55/1283 166/122 |

(Continued)

FOREIGN PATENT DOCUMENTS

| | | |
|---|---|---|
| CA | 1176189 | 10/1984 |
| CA | 2363764 | 5/2003 |

(Continued)

OTHER PUBLICATIONS

International Search Report issued in PCT/CA2009/001178 dated Dec. 3, 2009.

*Primary Examiner* — Vishal Pancholi
(74) *Attorney, Agent, or Firm* — Marsh Fischmann & Breyfogle LLP; Jonathon A. Szumny

(57) ABSTRACT

A restraint or gripping device for anchoring within the interior of a pipe comprises a pair of end plates adapted to be urged towards each other and a plurality of shoes, positioned between the end plates, and adapted to be moved radially outwardly as the end plates are urged together. In a further aspect, a method of restraining a pipe plug or isolation tool is provided. Also provided are assemblies for pipe isolation including an integral restraint or gripping mechanism.

3 Claims, 12 Drawing Sheets

(56) References Cited

U.S. PATENT DOCUMENTS

| | | | |
|---|---|---|---|
| 5,402,828 A | 4/1995 | Pino | |
| 5,797,431 A | 8/1998 | Adams | |
| 5,816,475 A | 10/1998 | Brookhouse | |
| 5,844,127 A | 12/1998 | Berube et al. | |
| 5,875,955 A | 3/1999 | Swain | |
| 6,131,441 A | 10/2000 | Berube et al. | |
| 6,745,795 B2 | 6/2004 | McGivery | |
| 7,240,697 B2 * | 7/2007 | Beebe | F16L 55/134 138/89 |

FOREIGN PATENT DOCUMENTS

| | | |
|---|---|---|
| DE | 29715889 | 2/1999 |
| JP | H06-004497 U | 1/1994 |
| JP | 2007-016883 A | 1/2007 |
| WO | 00/38290 | 6/2000 |
| WO | 07/041856 | 4/2007 |

* cited by examiner

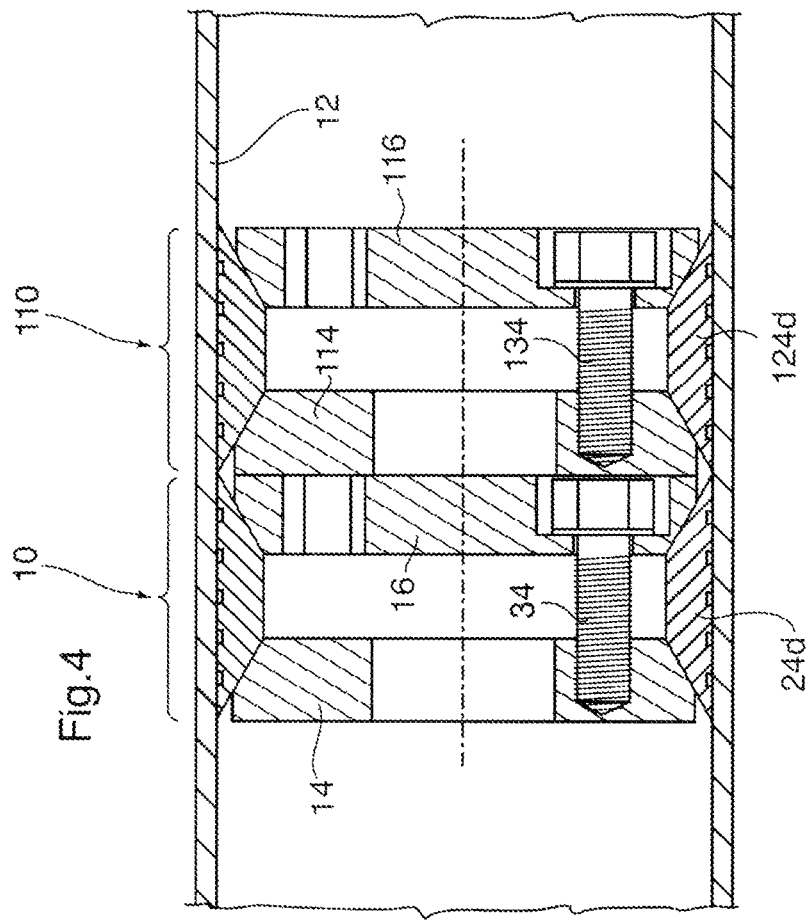
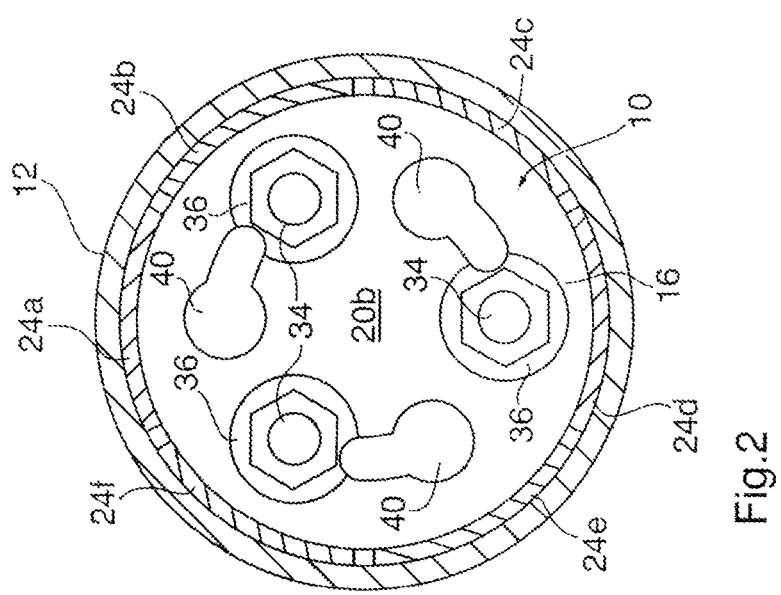

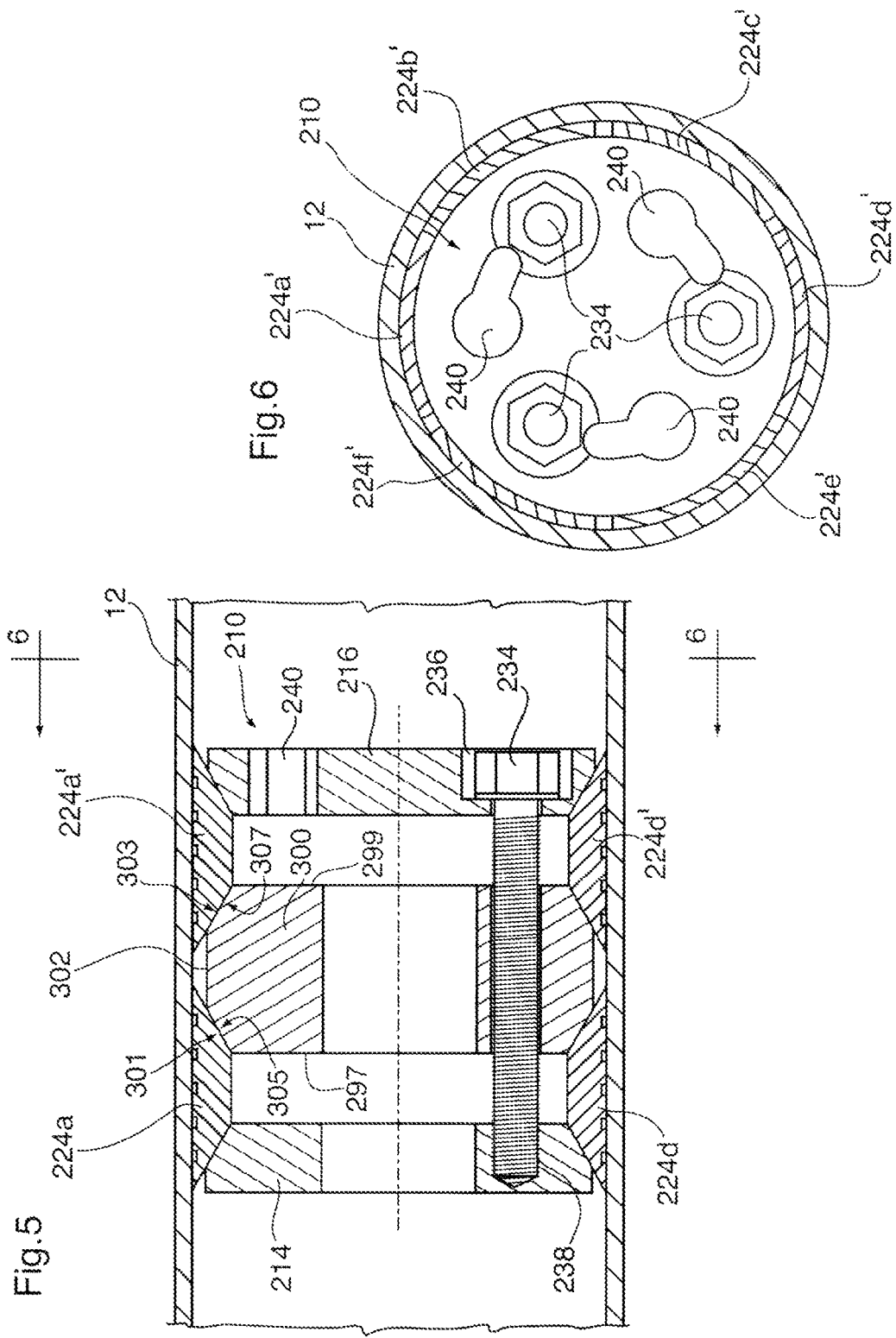

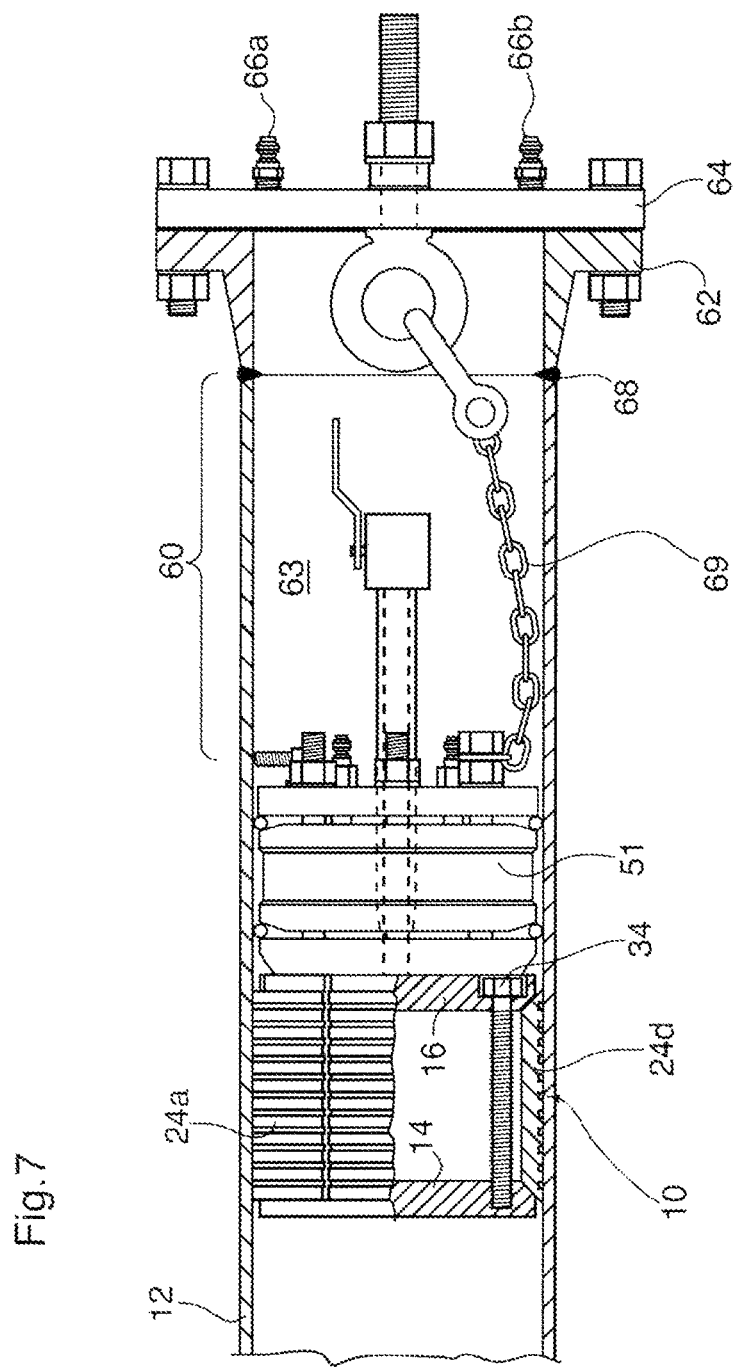

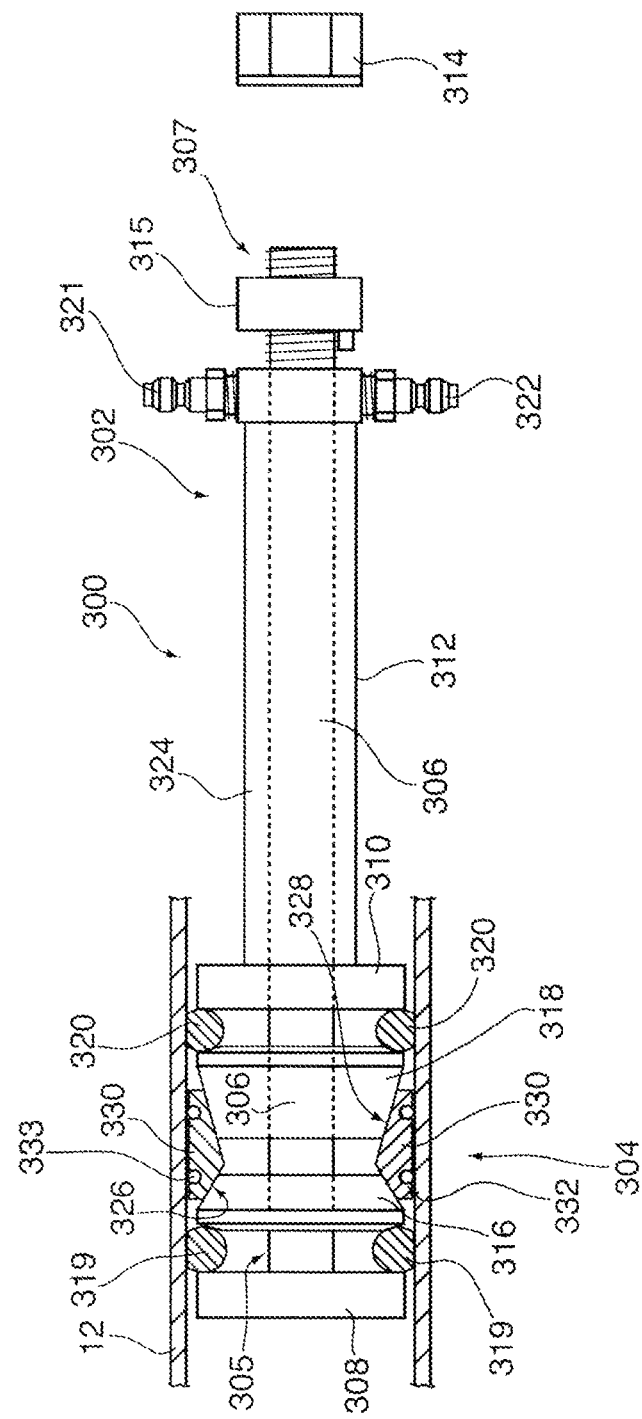

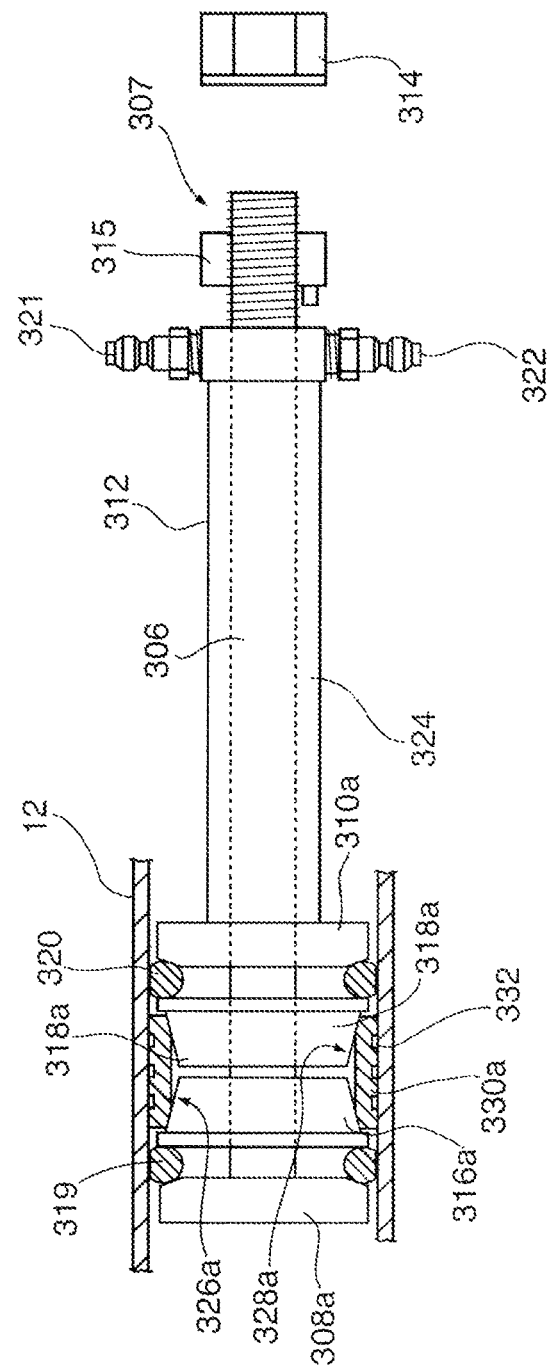

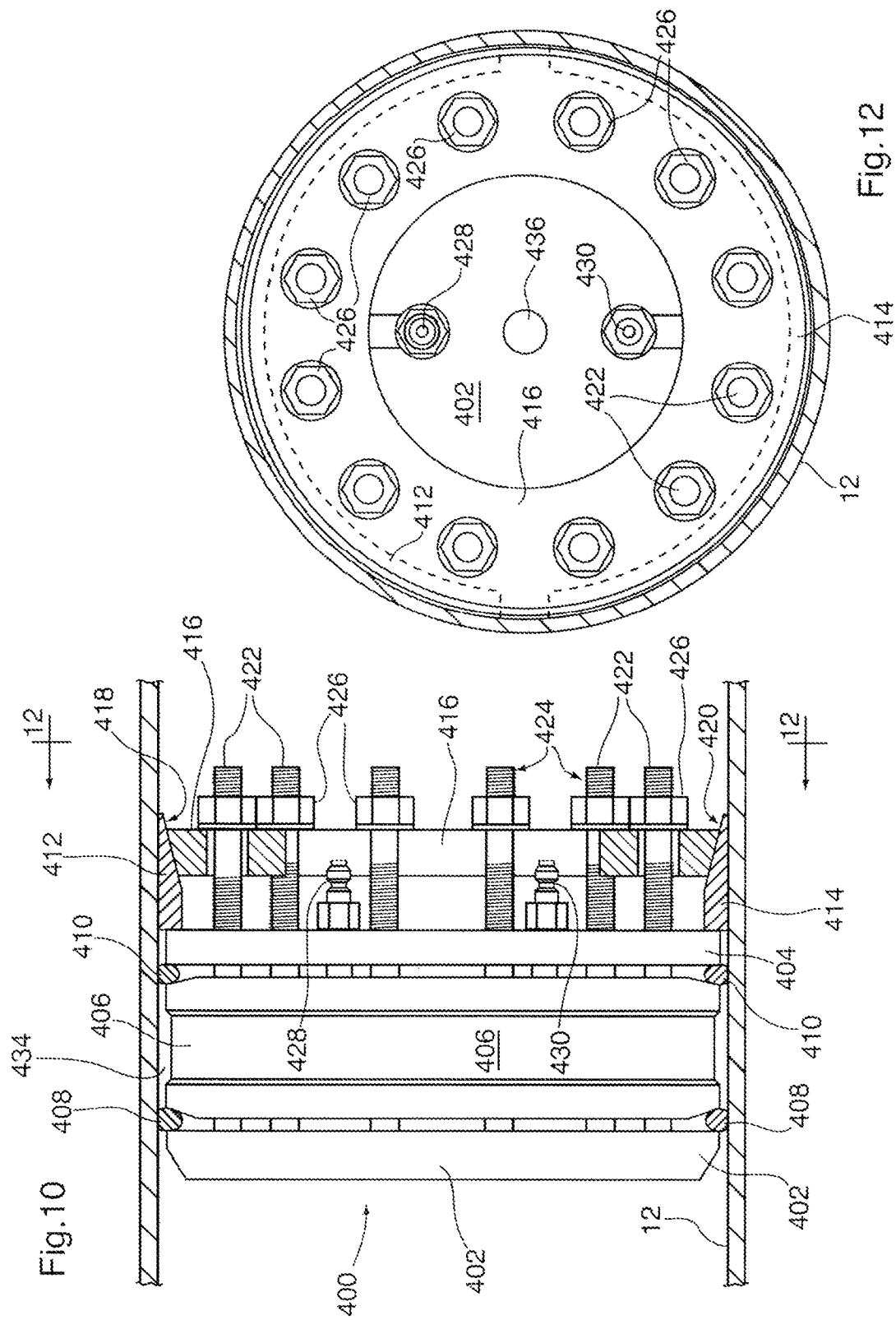

INTERNAL RESTRAINT DEVICE

CROSS REFERENCE TO RELATED APPLICATIONS

This application is a divisional of U.S. patent application Ser. No. 13/037,103, filed on Feb. 28, 2011, which is a continuation-in-part of PCT Application number PCT/CA2009/001178, filed Aug. 28, 2009, which claims priority from U.S. application No. 61/092,715, filed Aug. 28, 2008. The entire contents of the aforementioned prior applications are incorporated herein by reference.

BACKGROUND

1. Field of the Invention

The present invention relates to clamping or restraining devices that are capable of being anchored or clamped within the interior of pipes.

2. Relevant Background

It is common for testing tools to be utilized for testing the integrity of pipes or welds provided on pipes. In addition, various isolation tools are known, which are used to isolate a particular section of a pipe from another. Examples of such tools are provided in U.S. Pat. Nos. 5,844,127 and 6,131,441 (the entire contents of these patents being incorporated herein by reference). In use, tools such as these are inserted within a pipe and anchored against the interior wall of the pipe. With the tools of the aforementioned patents, the anchoring step is achieved by means of bolts and the like that deform resilient annular rings such that the rings deform radially outwardly against the pipe wall. The tools, once positioned and anchored are able to withstand a high degree of displacement pressure.

Notwithstanding the anchoring force provided by the aforementioned tools themselves, it may be advisable to provide, for additional safety, a further clamp or restraint device within the pipe to restrain the tool in the event that pressure is built up adjacent the tool. As will be understood by persons skilled in the art, in situations where the pressure exceeds the anchoring force of the tool, the tool may be violently ejected from the pipe. Thus, a restraint device would offer an additional support in such circumstances.

It is also known in the art to provide internal clamps to maintain two pipes in axial alignment while welding such pipes together. Examples of such internal clamps are provided in U.S. Pat. Nos. 4,463,938; 5,816,475; and 5,875,955 (the entire contents of these patents being incorporated herein by reference). The devices described in these patents comprise complex mechanical mechanisms that are designed to be anchored against the interior walls of adjacent pipes so as to hold such pipes in abutting arrangement. A welding process can then be applied to join the pipe ends together.

Another issue faced with known internal clamping devices is that they often result in damage to the internal wall of the pipe in which they are used. That is, many of the known clamps utilize shoes that are biased against the internal pipe wall and which are provided with teeth to engage such wall. The teeth provide an added anchoring force to prevent translational movement of the device within the pipe. However, as will be understood, once the device is removed, the marks left by such teeth would result in damage to the pipe interior and in some cases lead to a region of weakness.

The devices known in the art comprise either cumbersome and/or complex mechanisms or are not easily adaptable for use with testing or isolation tools or result in damage to the pipe. Thus, there exists a need for an improved internal pipe clamp or restraint device.

SUMMARY

The present invention provides an assembly which finds application in closing and sealing the open end of a pipe into which the assembly is inserted. The assembly comprises an isolation tool combined with a restraint device, said tool and device being coupled by threaded assemblies, such as tie rod assemblies, extending axially therethrough. In use, the threaded tie rod assemblies may be tightened to axially compress the isolation tool and actuate the restraint device. When the isolation tool is compressed, its spaced apart pair of annular sealing members are deformed and expand radially to sealably engage the pipe. Preferably the restraint device is concurrently actuated to drive its shoes radially outward into frictional engagement with the pipe wall. In conjunction therewith, the sealing members and pipe interact with the body of the isolation tool to form a sealed space into which pressurized fluid may be introduced for monitoring the sealing members for leakage.

More specifically, in one embodiment an assembly is provided for insertion in the open end of a pipe for the purpose of closing and sealing the pipe's bore, the assembly having upstream and downstream ends and, when in use, comprising:

first and second bosses;

a body positioned between the bosses said body having a recessed outer annular side surface;

first and second resilient, deformable, annular sealing members, each sealing member positioned between one end of the body and a boss;

the end surfaces of the body and the adjacent surfaces of the bosses being configured so as to radially deform the sealing members when the bosses and body are urged axially together;

a plate positioned downstream of the second boss;

the bosses, body and plate being arranged in parallel, spaced apart positions so that they extend transversely of the pipe bore;

an annular array of curved, spaced apart shoes positioned between the second boss and the plate, said shoes and plate having oppositely directed beveled edges in contact; and a plurality of tie rods extending axially through the assembly;

the body, second boss and plate being slidably mounted on the tie rods; and nuts threadably engaging the tie rods;

whereby the nuts may be advanced along the tie rods to axially compress the assembly to thereby deform the sealing members into sealing engagement with the pipe and drive the shoes outwardly and radially into frictional engagement with the pipe, whereby the annular side surface of the body, the inner surface of the pipe and the sealing members combine to form a sealed annular space;

the assembly forming port means, extending therethrough its downstream end to the sealed annular space, for introducing pressurized fluid into the space.

In one aspect, the invention provides a restraint device for anchoring within a pipe having an inner diameter, the device comprising:

first and second end plates, said end plates being adapted to be coaxially aligned when in use;

urging means provided on one or both end plates for urging said end plates together;

a plurality of shoes provided between the end plates;

the shoes being adapted to be moved radially outwardly as the end plates are urged together.

In another aspect, the invention provides a restraint system comprising one or more of the devices of the invention wherein the one or more devices are positioned within a pipe adjacent to a pipe plug or isolation tool.

In another aspect, the invention provides a method of restraining a pipe plug or isolation tool comprising: securing the pipe plug or isolation too within a pipe at a desired position; and securing a restraint device as described hereinabove within the pipe adjacent to said plug or tool.

In a further aspect, the invention provides an assembly for isolating an internal segment of a pipe, the assembly comprising:

a shaft having a first end and a second end;

a first boss connected to the first end of the shaft;

a sleeve slidably and coaxially provided over the shaft, the sleeve having a first end and a second end, wherein the first end of the sleeve is directed to the first end of the shaft;

a second boss secured to the first end of the sleeve;

first and second annular bodies provided between the first and second bosses, the first annular body positioned adjacent the first boss and the second annular body positioned adjacent the second boss;

a first resilient sealing member positioned between the first boss and the first annular body and a second resilient sealing member positioned between the second boss and the second annular body;

a plurality of shoes provided between the first and second annular bodies, the shoes being adapted to be urged radially outwards when the device is in use;

a nut, provided at the second end of the shaft for urging the sleeve towards the first end of the shaft.

In another aspect, the invention provides an assembly for isolating an internal segment of a pipe, the assembly comprising:

a first boss and a second boss;

an annular body provided between the first and second bosses;

a first and second resilient sealing members positioned on opposite ends of the annular body and between the respective first or second boss;

a plurality of tie rods extending from the first boss towards the second boss, the tie rods being adapted to extend through the inner diameter of the annular body and through a plurality of bolt holes provided on said second boss;

a plate provided adjacent the second boss on a side opposite to the annular body, the plate including a plurality of bolt holes through which the tie rods are extendable;

a plurality of shoes provided between the second boss and the plate; and, a plurality of first nuts provided for engaging the tie rods on a side of the plate opposite the shoes for urging the plate in a direction towards the first boss.

BRIEF DESCRIPTION OF THE DRAWINGS

These and other features of the invention will become more apparent in the following detailed description in which reference is made to the appended drawings wherein:

FIG. 2 is an end view of the device of FIG. 1 taken along the line 2-2.

FIG. 4 is a cross sectional view of two restraint devices of FIG. 1 in tandem use within a pipe.

FIG. 5 is a cross sectional view of a restraint device according to another aspect of the invention positioned within a pipe.

FIG. 6 is an end view of the device of FIG. 5 taken along the line 6-6.

FIG. 7 is a cross sectional view of a restraint device according to an aspect of the invention positioned within a pipe and shown in use with a pipe plug as known in the art.

FIGS. 8 and 9 are partial cross sectional views of another embodiment of the invention incorporating pipe isolation and gripping mechanisms.

FIGS. 10 and 13 are partial cross sectional views of another embodiment of the invention incorporating pipe isolation and gripping mechanisms.

FIG. 12 is an end view of the device of FIG. 10 taken along the line 12-12.

DETAILED DESCRIPTION

As used herein, the terms "clamp" or "restraint device" or "restraining device" will be understood to have the same meaning. That is, these terms will be used to refer to the present invention, which is adaptable to be inserted within a pipe and to be frictionally anchoring there-within, against the internal wall of such pipe. The invention will be described with reference to various aspects thereof. It will be understood that a number of modifications of the device will be possible in relation to the size of the device, which, in turn, relates to the size of the pipe in which the device is to be used.

Figure 1:
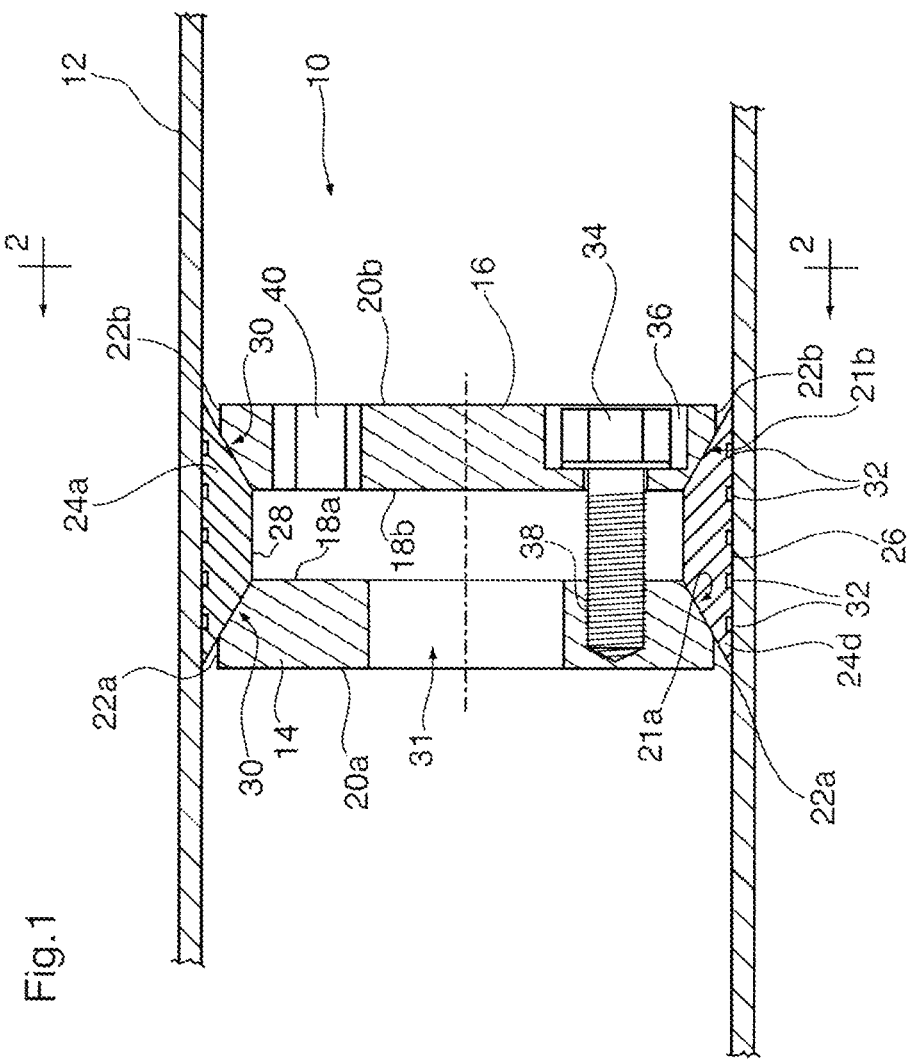
FIG. 1 is a cross sectional view of a restraint device according to an aspect of the invention positioned within a pipe.

One aspect of the present invention is illustrated in FIG. 1. As shown, the device 10 of the invention is provided within a pipe 12. The device 10 is shown in the engaged position wherein the device 10 is anchored against the interior wall of the pipe. The device comprises first and second, generally circular end plates 14 and 16, respectively. When the device is in use, as shown in FIG. 1, the end plates 14 and 16 are arranged in coaxial alignment with the longitudinal axis of the pipe 12. The end plates 14 and 16 have internal faces 18a and 18b, respectively, that face each other, and oppositely directed external faces 20a and 20b, respectively. The end plates 14 and 16 are provided with outer edges 22a and 22b, respectively. The outer edges 22a and 22b are generally circular in end view (such as shown in FIG. 2). As illustrated in FIG. 1, the diameter of the internal faces 18a and 18b is less than the diameter of the outer faces 20a and 20b. This is achieved by providing each of the outer edges 22a and 22b with a bevel, 21a and 21b, respectively, which extends from or near the external faces 20a and 20b towards the internal faces 18a and 18b, respectively.

As will be understood, and as shown in FIG. 1, the end plates 14 and 16 of the device 10, are sized so as to be slidably introduced into a pipe 12 to be tested. That is, the maximum diameter of the end plates is less than the inner diameter of the pipe 12.

The device 10 of the invention further includes a plurality of circumferentially spaced shoes or "gripper plates" 24. In the embodiment of the invention illustrated in FIGS. 1 and 2, six such shoes, 24a to 24f, are shown. However, it will be understood by persons skilled in the art that any number of such shoes may be provided and that such number may relate to the size of the shoes and the size of the circumference of the device itself. For example, in some cases, two or three shoes or gripper plates may be used depending on the need. For example, as will be appreciated, larger diameter devices may require a larger number of shoes as compared to smaller diameter devices. It will also be understood that in such larger diameter devices, the same number shoes may be used although of larger sizes. It will be understood that the invention is not limited to any number of shoes.

As shown in FIGS. 1 and 2, the shoes 24 are generally curved structures having an outer surface 26 that is adapted for abutting against the interior wall of the pipe 12 and an oppositely directed inner surface 28, directed towards the interior of the pipe 12. The shoes 24 also include opposite lateral edges 30 that comprise bevels and which are complementary to, or adapted to cooperate with, the bevels 21a and 21b provided on the end plates 14 and 16. The beveled edges 30 on the shoes result in the outer surface 26 having a greater width (i.e. the measurement from one edge to the opposite edge measured along the longitudinal axis of the device when in use) than the inner surface 28.

In one aspect, the outer surface 26 of the shoes 24 may be provided with grooves 32 as shown in FIG. 1. As will be appreciated by persons skilled in the art, such grooves 32 would serve to assist the frictional engagement of the device against the pipe inner wall as described further below. As will also be appreciated by persons skilled in the art upon reviewing the present description, the outer surface 26 of the shoes 24 may be provided with any type of coating, additive, covering etc. that would assist in reinforcing the frictional engagement of the shoes with the pipe internal wall when the device is in use and engaged within a pipe. In one example, some or all of the aforementioned grooves 32 may be provided with an 0-ring or other type of device or material. In addition, it will be understood that the degree of frictional contact can also be increased by increasing the surface area of the outer surfaces 26 of the shoes 24.

The shoes or gripper plates 24 may be made of any material. In one example, the shoes 24 are made of aluminum in order to reduce the weight of the device. The plates 14 and 16 may preferably be formed of a stronger material. The use of aluminum as the material for forming the shoes 24 is also preferred as the shoes would minimize the marking or damage to the inner wall of the tube 12. The invention will be understood to encompass various materials for forming the shoes 24 and/or the plates 14 and 16. For example, if the restraint device is to be used in plastic pipes, lighter materials may be used as the amount of anchoring force involved would generally be less than those encountered with metal pipes. Thus, for example, when the restraint device 10 is used with plastic pipes, the entire device may be formed of aluminum.

As shown in FIGS. 1 and 2, the device 10 further includes a plurality of bolts 34. In one aspect, the bolts 34 are generally circumferentially spaced around the circumference of the 23 device (e.g. around the end plate 16). The bolts are provided through bolt holes 36 provided in the second end plate 16 and extend through to a threaded apertures 38 provided in the first end plate 14. In the embodiment shown, the apertures 38 include threading that is complementary to threading provided on the bolts 34 whereby the bolts 34 can be tightened by engaging the apertures 38. It will be understood that the threading in apertures 38 can be replaced by using a fixed nut (not shown) on the opposite face 20a of the plate 14. In another embodiment, the bolts 34 can be replaced with threaded shafts (not shown), permanently fixed to the plate 14, with threaded ends of such shafts being inserted through the boltholes on plate 16 and wherein separate nuts are used to engage the shafts. In either of these examples, it will be understood that the purpose of the bolts is to urge the two plates 14 and 16 towards each other. Thus, the invention is not limited to any one means for achieving this. In addition, it will be understood that a variety of such urging means may be provided. As shown, the bolt holes 36 in the second end plate 16 may be include wells to receive the heads of the bolts 34. In such case, the outer face 20b of the end plate 16 would have a planar surface. As discussed further below, such planar surface may be preferred where a testing or isolation tool is to be abutted there-against.

A method of using the device will now be discussed in relation to the aspect of the invention illustrated in FIGS. 1 and 2. In use, the components of the device, namely, the end plates 14 and 16, the shoes 24 and the bolts 34 may be inserted into the pipe individually and joined later. In a preferred aspect, however, such components are first loosely combined or joined outside of the pipe. In such arrangement, the end plates 14 and 16 are relatively spaced away from each other. As will be understood, in such loose arrangement, the shoes 24 are moveable radially so that the maximum outer diameter of the device 10 is less than the inner diameter of the pipe 12. In this way, the device 10 can be slidably introduced into the pipe 12 and positioned at a desired location therein. Once in position, the bolts 34 are tightened, whereby the end plates 14 and 16 are urged towards each other. As will be understood and as shown in FIG. 1, this process causes the shoes 24 to be forced radially outwardly from the device 10 and towards the inner surface of the pipe 12. Such radial outward force is attributed to the cooperating and oppositely directed bevels on the end plates and the shoes. As will be understood, as the plates 14 and 16 are urged towards each other, the respective beveled edges 21a, 21b of the plates bear against the opposing beveled edges 30 of the shoes 24a-d. Due to opposed orientation of the bevels, urging of the plates 14 and 16 towards each other (achieved by tightening the bolts 34) causes the shoes 24a-d to be urged radially outward. As the bolts 34 are further tightened, the shoes are tightly biased against the pipe inner wall thereby forming a tight frictional contact there-between.

In a preferred embodiment of the invention, the bolts 34 are provided in a generally equal, circumferentially spaced manner about the plates 14, 16. This arrangement serves to evenly distribute the urging force applied to the end plates 14 and 16 and, thereby, resulting in the shoes being evenly displaced in a radially outward direction. In a further preferred embodiment of the method of the invention, the bolts 34 are tightened in circumferentially opposite pairs so as to achieve an even circumferential distribution of forces applied to the end plates. In this way, the plates 14 and 16 are urged together evenly thereby preventing one or both plates from "tilting" within the pipe. That is, the plates 14 and 16 are maintained in a generally perpendicular arrangement with respect to the longitudinal axis of the pipe 12. It will be understood that this arrangement is not a limitation of the invention but merely a preference. It will also be understood that at least some deviation from a true perpendicular arrangement will occur.

As will be understood, the bolts 34 provide a means for urging the plates 14 and 16 towards each other. It will therefore be appreciated that while the bolts 34 provide a simple and effective embodiment for such urging means, the invention is not limited by this one embodiment. For example, in another embodiment, the bolts 34 may be replaced with hydraulic or pneumatic devices that also serve the same purpose. In one example, hydraulic rams or jacks can be used to force the plates together. In another example, the plates can be urged together using magnetic devices. In the latter instance, one or both of the plates 14, 16 can be provided with a magnetic device, such as an electromagnet, which can be actuated when the device 10 is in position. Such magnetic devices (not shown) will cause the plates 14 and 16 to be forced together in the same manner as the bolts 34. In a further embodiment, a threaded rod or shaft may be affixed to one of the end plates, such as the first end plate, and such rods may extend through and beyond the second end plate. Cooperating nuts, with or without a bearing plate, may then be used to urge the end plates together The invention is not limited to the specific urging means disclosed herein. The characteristic of such urging means is the ability to cause the plates 14 and 16, or opposite ends of the device 10, to be urged together and, thereby, to cause radially outward displacement of the shoes or gripper plates 24.

FIG. 1 illustrates the first end plate 14 as having a generally annular ring shape. That is, the first end plate 14 includes a central opening 31. In a similar manner, the second end plate 16 may also be provided in the form of an annular ring. As will be understood, the use of such rings would reduce the overall weight of the device, which would be particularly desirable where the device 10 is designed for use with pipes of large diameter.

As shown in FIG. 2, one or both of the end plates, 14 and 16, may be provided with one or more slots 40 adapted to receive and retain bolts provided on a testing or isolation tool or the like. In one aspect, the slots 40 are provided with a keyhole shape whereby the head of one or more bolts (not shown) may be inserted into a larger portion of the slot 40 and, once circumferentially rotated about the axis of the device 10, the head is received within the smaller portion of the slot 40. In this manner, the bolts are retained within the slot 40 and prevented from being axially separated therefrom. Thus, any tool or other such apparatus attached to the bolts is prevented from being axially separated from the restraint device. As will be understood, this type of engagement is common and various modifications of same will be apparent to persons skilled in the art. It will also be understood that such linking of the restraint device to other apparatus is only one aspect of the invention and that the invention is not limited so any such linked arrangement.

Figure 3:
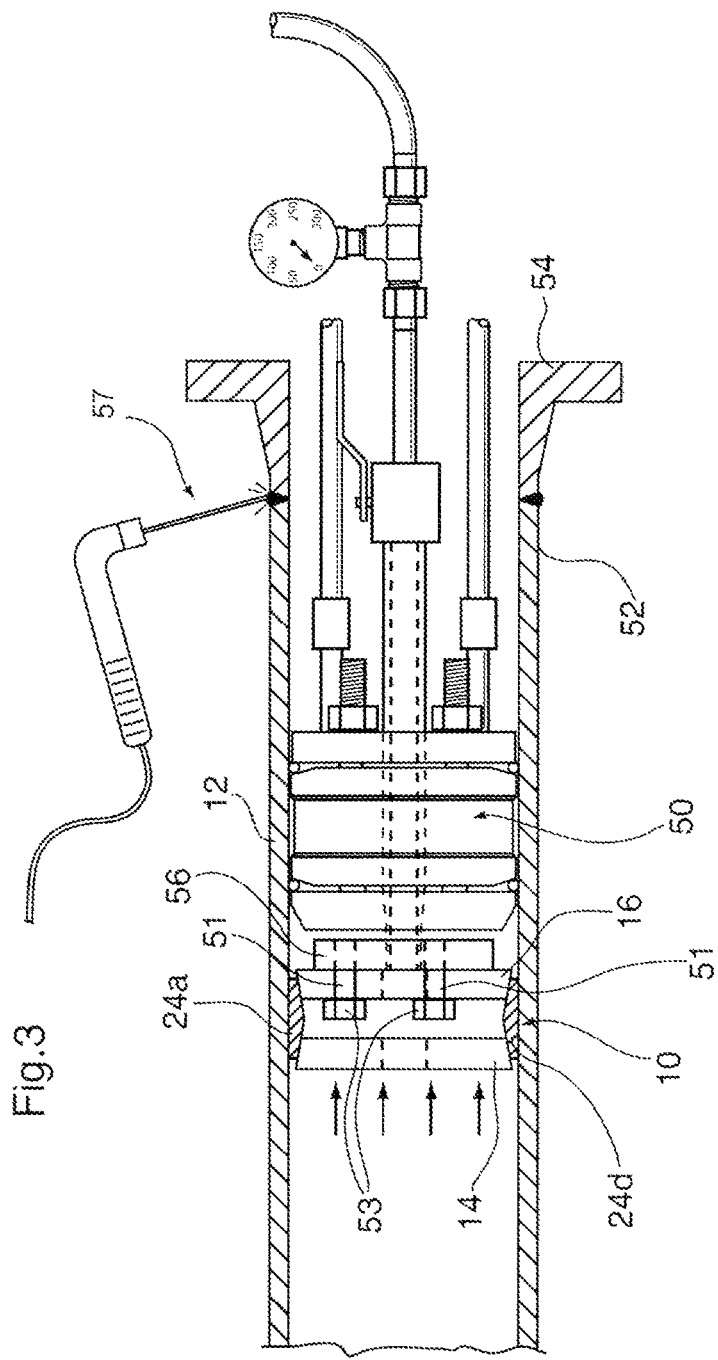
FIG. 3 is a cross sectional view of a restraint device according to an aspect of the invention positioned within a pipe and shown in use with an isolation tool as known in the art.

FIG. 3 illustrates the restraint device 10 according to one use. As shown, the restraint device 10 is positioned within a pipe 12 and anchored thereto in the manner described above. By way of example, a testing or isolation tool such as that taught in U.S. Pat. No. 6,131,441 (the entire contents of which are incorporated herein by reference), is shown at 50. In the example illustrated in FIG. 3, the tool 50 is used to isolate an internal section of the pipe 12 from an end 52 thereof, to which a flange 54 is being attached by welding 57. It will be understood that it may be desired or necessary to isolate a given section or segment of a pipe for any variety of other reasons. Primarily, isolation tools such as that shown at 50 can be used to prevent fumes, combustible vapors etc. contained or generated within the pipe 12 from reaching the welding region where the heat from the welding procedure may result in ignition of such fumes and cause an explosion. In another aspect, an isolation tool 50 may also or alternatively be used to prevent heat generated by the welding process from being conducted over the length of the pipe 12. For example, as taught in U.S. Pat. No. 6,131,441, the isolation tool may be provided with a cooling water flow to act as a thermal barrier. In order to increase safety to operators, personnel and surrounding equipment, the restraint device 10 may be used with such testing or isolation tools in order to provide an anchor within the pipe to maintain such testing or isolation tool in place. For example, in some cases, during use of a testing or isolation tool 50, fumes within the pipe 12 may become pressurized to a dangerous level and, for this reason, the restraint device 10 of the invention may be provided as a further anchor or restraint for the tool 50. In other words, the device 10 serves to restrain the tool 50 from being axially displaced within the pipe.

It will be understood that the restraint device 10 of the invention can be used with any type of isolation or testing tool as would be known to persons skilled in the art. The examples herein, depicting specific tools (such as the tool of U.S. Pat. No. 6,131,441), are provided solely for the purpose of illustrating how the invention may be used. The apparatus of method of the invention is not restricted to any isolation or testing tool. Clearly, as will be understood, the present invention serves in one aspect to provide added safety where such testing or isolation tools are used.

As will be understood, providing the restraint device upstream (i.e. opposite to the pipe opening) of the testing or isolation tool 50, serves to prevent axial displacement of the tool 50 in the upstream direction. In some cases, the testing or isolation tool 50 may be connected to the restraint device 10 thereby preventing axial movement of the tool 50 in the downstream direction as well. For example, in one aspect, as shown in FIG. 3, the testing or isolation tool 50 may be provided with a locking plate 56 extending from the tool toward the interior of the pipe. The locking plate may be provided with axially extending bolts 51, the heads 53 of which can be received and locked within the aforementioned slots 40 provided on the end plate of the device 10. As discussed previously, in this arrangement, the tool 50 and the restraint device 10 are linked or locked together thereby preventing axial separation. As discussed above, the linking of the bolt heads 53 into the slots 40 is accomplished by first positioning and securing the restraint device 10 within the pipe, followed by insertion of the tool 50 having the locking plate 56 attached thereto. The bolt heads 53 of the locking plate 56 are then inserted into the wide portions of the slots 40 and the tool 50 and locking plate 56 are rotated circumferentially in order to cause the bolts 51 to be received within the narrow portions of the slots 40 thereby locking the tool 50 to the restraint device 10. At this point, the testing or isolation tool 50 can then be secured to the pipe in the usual manner. It will be appreciated that any other means can be used to secure the tool 50 to the restraint device 10. For example, the two devices may simply be connected together by chains, hooks, cables and the like. In either case, it will be understood that such connection means serves to prevent axial separation of the tool 50 and the restraint device 10 when both are installed within a pipe 12.

FIG. 4 illustrates a further aspect of the invention wherein two devices 10 and 110 are utilized in tandem. For convenience, elements of the device 110 that are common with device 10 are identified with the prefix "1". Thus, as shown both the devices 10 and 110 include first end plates 14 and 114, respectively, and second end plates 16 and 116, respectively. As will be understood, the use of two restraint devices such as 10 and 110 doubles the anchoring force provided in the pipe 12. As discussed above, a similar result may be achieved by using the device with shoes 24 of a larger width so as to increase the contact surface area between the shoes and the pipe inner surface. However, the use of two devices 10 and 110 would 32 achieve the same result but with minimizing the weight for each of the components. In other words, rather than having sets of large shoes, for example, the use of two devices allows the use of more but smaller shoes. In using the devices as shown in FIG. 4, it will be easily understood that one of the device 10 will be first installed within the pipe and, following this, the second device 110 will be similarly installed. It will also be understood that any number of such devices can be used to provide a cumulative anchoring force. It will further be understood that each of the device 10, 110 (or other number, if applicable) can each be of a different size.

FIGS. 5 and 6 illustrate the device of the invention according to another aspect. In these figures, like elements are referred to with the reference numerals used above with respect to FIG. 1 but with the numeral "2" added as a prefix for clarity. As shown, the device 210 is constructed essentially in the same manner as the device 10 described above. However, as shown in FIG. 5, the device 210 is provided with a boss 300 coaxially aligned with the end plates 214 and 216 and positioned there between when the device 210 is in the assembled state. In one example, as shown in FIG. 5, the boss 300 comprises a generally annular shaped body having an outer diameter that is less than the inner diameter of the pipe 12 so that the boss 300, as with the end plates 214 and 216, can be coaxially aligned within the interior of the pipe and slidably positioned at a desired location therein. The outer end 302 of the boss 300, forming the larger diameter thereof, is provided with oppositely directed beveled edges, 301 and 303, adjacent each face 297 and 299, respectively, whereby the outer diameter of the boss 300 at its external faces is less than the diameter at a central portion of the boss 300. As shown in FIG. 5, the device 210 includes shoes 224 that are provided in pairs, wherein one of the pairs is identified with "'". Thus, a first pair of shoes is shown at 224a and 224a' while a second pair of shoes is shown at 224d and 224d'. The beveled edges 301 and 303 provided on the boss 300 are adapted to be complementary to the bevels of the shoes provided on opposite sides of the boss 300. For example, as shown in FIG. 5, the bevels 301 and 303 of the boss 300 are adapted to be complementary to the bevels 305 and 307, respectively. As shown, the bevel 305 is provided on the shoe 224a while the bevel 307 is provided on the shoe 224a'. Each of shoes 224a and 224a' etc., will be understood to have a further bevel on the edges opposite to the boss 300, for engaging the respective end plates 214 and 216.

As will be understood, the restraint device 210 illustrated in FIGS. 5 and 6 will be installed within the pipe 12 in a similar manner as described above. That is, the device 210 will include some means for urging the end plates 214 and 216 together. In one embodiment, such means comprises bolts 234 that extend from one of the end plates (e.g. 216) to cooperatively threaded boltholes 238 provided the other of the end plates (e.g. 214). As will be understood, as the bolts 234 are tightened, the plates 214 and 216 are urged towards each other in the axial direction. To assist in this process, the bolts may be tightened in a sequence wherein bolts that are circumferentially opposite one another are tightened so as to prevent one end plate from tilting within the pipe. As the bolts 234 are tightened, the end plates 214 and 216 force the various shoes 224 and 224' to be urged together and thereby "sandwiching" the boss 300. In this process, the oppositely directed and complementary bevels described above cause the shoes 224 and 224' to be forced radially outwardly and thereby against the inner wall of the pipe 12. Tightening of the bolts 234 may continue until the desired anchoring force is achieved between the restraint device 210 and the wall of the pipe 12. As discussed above, the use of bolts 234 as the urging means is only one embodiment of the invention and various other such urging means may be used such as hydraulic rams or jacks, magnetic devices etc.

As will be understood, the device 210 of FIG. 5 serves to provide an added anchoring force against the inner surface of the pipe by increasing, i.e. doubling, the contact area of the shoes or gripper plates. Thus, the effective force offered by the "double" device 210 would be greater than that offered by the "single" device 10 shown in FIG. 1. It will be understood that various other modifications of the device of the invention may be possible to achieve similar results. For example, it would be possible to provide a "triple" device. Alternatively, any combination of the various forms of the invention described above may be made depending upon the needed anchoring force.

In another aspect, not shown in the drawings, the device shown in FIG. 5 may be used in butt welding adjacent pipe segments together according to the methods described in the patents mentioned above. For example, the restraint device 210 of FIG. 5 may be provided at the junction of two pipes, wherein the device is positioned within the interior of each pipe portion. It will be understood that the pipes would be axially aligned in order to be welded together. The restraint device 210 would be positioned so as to allow the joint between the pipes to lie over the boss 300. Once the restraint device 210 is in position, the bolts 234 may be tightened so as to anchor the device 210 within each pipe segment. Once the device 210 is so anchored, a welding operation may be performed to join the abutting ends of the pipes together. In this example, the device 210 would therefore serve to maintain the pipe segments in the desired orientation until the welding process is completed. At such time, the device may be loosened and removed.

FIG. 7 illustrates another use of the restraint device of the invention. As shown, a restraint device 10 as described previously, is provided within a pipe 12. As illustrated, the restraint device 10 includes the same structure as that shown in FIG. 1, comprising a pair of opposed end plates 14 and 16 with a plurality of shoes or gripper plates 24 provided there-between. An urging means, such as a plurality of bolts 34, serve to urge the plates 14 and 16 axially towards each other. One aspect illustrated in FIG. 7 is the elongated versions of the shoes 24. As will be understood, and as discussed above, the invention is not limited to any size of the elements of the device. In FIG. 7, it will be seen that, in order to accommodate the longer shoes or gripper plates 24, the bolts 34 are made longer as well.

In a manner similar to that discussed above with respect to FIG. 3, the restraint device 10 shown in FIG. 7 is used in combination with other pipe testing or isolation tools. As shown, FIG. 7 illustrates the use of the restraint device 10 with a pipe plug 51 as known in the art. Such plug may, for example, be the same as the isolation tool described earlier.

The plug 51 may be any tool or device that is used to seal a portion of a pipe from the remainder of the pipe. In the example shown in FIG. 7, the plug 51 serves to seal off an end portion of a pipe 6 from the balance thereof. For this purpose, the plug 51 is inserted a certain distance into the pipe and secured in place according to the appropriate protocol. Such placement creates a sealed-off section 60 of the pipe 12. As shown, the pipe 12 includes a flange 62 as is typically the case. A blind flange 64 is then provide opposite the flange 62 opening and secure thereto using bolts and the like as is commonly known. The blind flange 64 is essentially a plate that is used to cover the flange 62 opening. As will be known, gaskets etc. can be used to create a sealed volume 63 within the pipe 12 extending from the blind flange 64 to the plug 51. The blind flange 64 preferably includes one or more ports, such as ports 66a and 66b that extend through the blind flange 64 and into the sealed volume 63. The ports are used to pressurize the sealed volume 63 whereby monitoring of the pressure is conducted in order to assess the integrity of the weld 68 securing the flange 62 to the pipe 12. As will be understood, in conducting such a weld test, the pressure to which the sealed volume 63 is subjected would generally be high. As such, the risk of axial displacement of the plug 51 can be minimized by using the restraint device 10 as described herein. As a further reinforcement, the plug 51 may be secured to the blind flange 64 using a tether 69 or the like. In one example, the tether 69 comprises a chain attached to the blind flange 64 and the plug 51. However, it will be understood that any other 32 version of a tether may be used. Due to the pressure created in the sealed volume 63, it will be understood that the plug 51 will only be forced to move axially upstream within the pipe 12. For this reason, the use of a locking plate as discussed with reference to FIG. 3 would not be necessary since the plug 51 would not be urged to move downstream of the restraint device 10.

A further aspect of the invention is shown in FIGS. 8 and 9, wherein a gripping mechanism having the above described characteristics is combined with a testing or isolation tool. As shown in FIG. 8, a testing or isolation assembly 300 comprises a testing or isolation tool 302. Hereinafter, these two terms will be referred to as "isolation assembly" and "isolation tool" only for convenience. This use of nomenclature is not intended to limit the invention in any way to one tool or another. The isolation assembly 300 also includes a restraint mechanism 304 and the entire assembly is adapted for insertion within a pipe 12. The isolation assembly comprises a shaft 306, the first or upstream end 305 of which is connected to a first boss 308. The shaft 306 may be secured to the first boss 308 by any known means such as welding, threading etc. A second boss 310 is slidably and coaxially provided over the shaft 306 and positioned downstream, i.e. away from the first boss 308, on the shaft 306. As will be understood, the first and second bosses 308, 310 have a generally circular outer surface so as to allow insertion into a cylindrical pipe 12. In one aspect, the bosses 308 and 310 are annular in shape. A sleeve 312 is then coaxially and slidably provided over the shaft 306, wherein the 7 sleeve 312 is provided downstream of the second boss 310. In a preferred embodiment, as shown in FIG. 8, the second boss 310 is secured to the upstream end of the sleeve 312. In one embodiment, the boss 310 is secured to the sleeve by welding. The isolation assembly 20 further includes a nut 314 provided downstream of the sleeve 312. The nut is adapted to engage a second or downstream end 307 of the shaft 306, which end is provided with threading that is complementary to that on the nut 314.

In one embodiment, a collar 315 may also be provided between the nut 314 and the sleeve 312. It will be understood that the collar may form part of the sleeve 312 itself.

The isolation assembly further includes two generally annular shaped bodies comprising a first annular body 316 and a second annular body 318. The first annular body 316 is positioned adjacent the first boss 308 and downstream thereof while the second annular body 318 is positioned between the first annular body 316 and second boss 310. As shown in FIG. 8, the annular bodies 316 and 318 are slidably provided over the shaft 306.

The isolation assembly 300 further includes a pair of resilient sealing members 319 and 320 which may comprise, for example, 0-rings. As shown in FIG. 8, the first sealing member 319 is provided coaxially and over the shaft 306 and positioned between the first boss 308 and the first annular body 316. The second sealing member 320 is provided coaxially over the shaft 306 and positioned between the first annular body 316 and the second boss 310. The sealing members 319 and 320 are sized to have an outer diameter that is less than the inner diameter of the pipe 12. However, the sealing members 319 and 320, due to their resilient nature, are designed or adapted to be expandable to be forced against the inner wall of the pipe 12 when in use. This aspect is discussed further below.

As will be understood from the above description and FIG. 8, as the nut 314 is tightened over the shaft 306, the nut is forced to bear against the sleeve 312 whereby the 10 sleeve 312 is urged axially over the shaft 306 in the upstream direction. Due to its connection to the sleeve 312, the second boss 310 is similarly urged in a direction towards the first boss 308. As the bosses 308 and 310 are urged towards each other in this manner, it will be understood that the elements positioned there-between, the sealing members 319 and 320 and the annular bodies 316 and 318, will also be urged together. Once the individual elements of the assembly 300 are brought into contact, further tightening of the nut 314 results in compression and, therefore radially outward deformation of the resilient sealing members 319 and 320. In particularly, it will be noted that the first sealing member 319 is compressed between the first boss 308 and the first annular body 316 while the second sealing member 320 is compressed between the second annular body 318 and the second boss 310. The elements of the assembly 300 will be understood to be adapted so as to allow the sealing members 319 and 320 to form a desired amount of sealing force against the inner wall of the pipe 12 so as to prevent axial displacement of the assembly 300 within the pipe 12. As will be understood, the sealing members 319 and 320 create a separation within the pipe separating the sections upstream and downstream of the assembly 300. In a preferred embodiment, the first boss 308 may be provided with a central aperture (not shown) opening into a bore (also not shown) provided axially through the shaft 306. In this way, any fumes etc. contained or built up in the upstream section of the pipe 12 may be safely vented through the assembly 300. Further, although not shown, the downstream end 307 of the shaft 306 may include a gauge connected to the bore for measuring the pressure of the upstream portion of the pipe 12. In this way, venting of any fumes etc. would be allowed only when a critical pressure is reached. As will be understood this feature offers added safety to operators where the fumes are noxious. Additional details of the use of the isolation assembly 300, as described above, will be apparent to persons skilled in the art in view of applicant's previous patent number U.S. Pat. No. 6,131,441.

The isolation assembly 300 may be adapted for creating a further seal using a pressurized fluid as also taught in U.S. Pat. No. 6,131,441. In this regard, the sleeve 312 may be provided with one or more ports 321 and 322 that open into an annular space 324 formed between the outer wall of the shaft 306 and the inner wall of the sleeve 312. It will be understood that, for this purpose the shaft and sleeve will be sized accordingly to provide the required separation and volume of the annular space 324. The second boss 310 will also be provided with an inner diameter that allows the annular space 324 to be in fluid communication with the volume 323 within the pipe 12 constrained by the two bosses 308 and 310. In this arrangement, a pressurized fluid may be introduced into one of the ports 321 or 322 in order to fill the annular space 324 and the volume 323 between the bosses 308 and 310, when the assembly 300 is in use within a pipe 12. As will be appreciated, for this purpose, it is preferred to use two ports so as to allow venting of any air during the initial filling operation. In operation, the assembly 300 is positioned within the pipe 12 at a desired location and the sealing members 319 and 320 are deformed to form the required seals with the pipe 12. The volume 323 between the bosses is then filled with the fluid (as described previously) and the pressure therein raised to the required level. As will be understood, the pressurized fluid thereby forms a further seal to prevent passage of any fumes from one side of the assembly 300 to the other, when in use within the pipe 12. As known in the art, such as from U.S. Pat. No. 6,131,441, the pressurized volume 323 may also be used to pressure test a weld or other such feature on the pipe 12. In such case, the assembly 300 is positioned in the pipe with the section forming the volume 323 positioned in the region of the weld to be tested. Monitoring the pressure within the volume 323 provides an indication of any defects in the weld in the manner known in the art.

The restraint tool 304 of the isolation assembly 300 will now be discussed. As shown in FIG. 8, the annular bodies 316 and 318 are preferably provided with beveled outer diameters 326 and 328, respectively. In this embodiment, the bevel 326 of the first annular body 316 is formed with a reducing outer diameter at the downstream end thereof, wherein the reduction in diameter increases in the downstream direction (i.e. the downstream end of the annular body 316 has the smallest outer diameter). The bevel 328 of the second annular body 318 is formed with a reducing diameter in the upstream direction (i.e. the upstream end of the annular body 318 has the smallest outer diameter). It will be understood that end of the annular bodies 316 and 318 abutting the sealing members 319 and 320 will have a sufficient surface area to engage the sealing members. In this regard, as shown in FIG. 8, the ends of the annular bodies adjacent the sealing members may be provided with at least a portion that is not beveled at its outer diameter.

The assembly 300 preferably further includes a plurality of shoes or gripper plates 330 that are provided between the annular bodies 316 and 318. As discussed in the foregoing disclosure, the shoes 330 are provided on the assembly in a manner that enables them to be urged radially outwardly against the inner wall of the pipe 12. By urging the shoes in this manner and to a desired force, causes the shoes to "grip" the inner wall of the pipe 12. As will be understood from the embodiment illustrated in FIG. 8, the shoes 330 are forced radially outwardly by virtue of the bevels 326 and 328. More particularly, as the nut 314 is tightened, and the bosses 308 and 310 are urged towards each other, the annular bodies 316 and 318 are similar urged towards each other as described above. In this process, due to the orientation of the bevels 326 and 328, the shoes 330 are urged radially outwardly and, thereby, forced against the inner wall of the pipe 12. To further assist in this process, and as illustrated in FIG. 8, the shoes 330 may be provided with cooperating bevels on their radially inward surfaces, which engage the bevels 326 and 328 provided on the annular bodies 316 and 318. As will be understood, any number of shoes or gripper plates 330 may be provided depending on the need and weight restrictions etc. In other words, more shoes may be included if more gripping force is required or if the size of the shoes needs to be reduced to facilitate handling. In one example, three shoes may be provided, each preferably being equidistantly spaced over the circumference of the assembly 300.

In situations where the shoes or gripper plates 330 are used in combination with the pressurization of the volume 323, it will be understood that the pressurizing fluid will also assist in forcing the shoes radially outwardly.

In FIG. 8, the angles of the bevels 326 and 328 are shown as being dissimilar. Accordingly, the corresponding bevels on the shoes 330 are also dissimilar. It will be understood that such arrangement is only one embodiment of the invention and is not a limitation. The variable bevel angles results in different frictional forces to be applied by the shoes 330. Thus, if one end of the shoes is required to be forced against the pipe wall to a greater degree that the opposite end, a different "lift" angle can be used.

As also shown in FIG. 8, the shoes or gripper plates 330 may be provided with one or more circumferential grooves 332 within which sealing members such as 0-rings 333 may be incorporated. As discussed previously, the provision of such sealing members allows for additional gripping forces to be provided by the shoes.

FIG. 9 illustrates the same assembly as in FIG. 8 but with a few modifications to illustrate some other possible embodiments. In FIG. 9, elements that are identical with those shown in FIG. 8 are identified with like reference numerals. Elements that are similar but different are identified with the same reference numerals but with the suffix "a".

As shown in FIG. 9, the bosses 308a and 310a may be provided in one embodiment with a beveled outer edge corresponding to the location of the respective sealing members 319 and 320. In this manner, the sealing members are maintained in position and are directed radially outwardly during deformation. It will be understood that similar bevels may be provided on the outer edges of the annular bodies 316a and 318a. FIG. 9 also illustrates an embodiment wherein the bevels 326a and 328a provided on the annular bodies 316a and 318a are of the same angle. In a further embodiment, FIG. 9 illustrates shoes, or gripper plates, 330a lacking the cooperating beveled inner diameters shown in FIG. 8. In this case, the inner surfaces of the shoes 330a are generally flat as with previously described embodiments. However, it will be understood that the function of the shoes 330a will still be the same due to the bevels on the annular bodies.

FIGS. 10 to 13 illustrate a further embodiment of the invention that is suitable for larger diameter pipes. In particular, FIGS. 10 to 13 illustrate a variation to the combination testing/isolation and gripper assembly shown in FIGS. 8 and 9. As shown in FIGS. 10 and 12, the assembly 400 includes a first, upstream boss 402 and a second, downstream boss 404. As before, the terms "upstream" and "downstream" are used for convenience, in terms of the assembly when installed in a pipe and in use. The assembly 400 further includes an annular body 406 positioned between the two bosses 402 and 404. As illustrated in FIG. 10, the bosses 402, 404 and the annular body 406 are axially aligned. First and second resilient sealing members 408 and 410 are co-axially provided, wherein the first sealing member 408 is provided between the first boss 402 and the annular body while the second sealing member 410 is provided between the annular body 406 and the second boss 404. In the embodiment shown in FIG. 10, the opposite ends of the annular body 406 are each preferably provided, at the outer edges thereof, with a bevel for receiving the respective resilient sealing member and for directing its deformation radially outwardly (as discussed further below). In similar manner, bevels may be provided along the outer circumferential edge of the respective bosses for achieving the same result. It will be understood that such bevels can be provided on one or both of the opposing faces of the bosses and annular body.

On the downstream side of the second boss 404 (i.e. the side opposite the annular body), a plurality of shoes or gripper plates are provided. In the embodiment shown in FIGS. 10 to 13, two shoes, 412 and 414 are shown. It will be understood that any number of such hoes or gripper plates may be utilized. Downstream of the shoes 412 and 414, a front plate 416 is coaxially provided on the assembly 400. In one preferred embodiment as illustrated in FIGS. 10 to 13, the shoes 412 and 414 are provided with beveled inner diameters 418 and 420, respectively, wherein the thinner edges of the shoes are facing downstream, away from the second boss 404. In addition, according to one embodiment, the front plate 416 is provided with beveled outer diameter wherein the outer diameter on the upstream side (i.e. adjacent the shoes 412 and 414) is the smallest. As shown particularly in FIG. 10, this arrangement of bevels on the shoes 412, 414 and the front plate 416 preferably allows the front plate to slide over the downstream portions of the shoes. In particular, as shown in FIG. 10, the bevel of the front plate 416 is allowed to pass over the beveled portions of the shoes 412, 414, whereby such portions of the shoes are sandwiched between the outer diameter of the front plate 416 and the inner wall of the pipe 12. As discussed below with respect to FIGS. 14 and 15, the bevel provided on the shoes 412, 414, may also be provided on the opposite ends thereof.

The first boss 402 is provided with a plurality of tie rods 422 that are generally circumferentially equidistantly spaced. The tie rods 422 are sized and positioned to extend through the inner diameters of the sealing members 408, 410, and the annular body 406. The second boss 404 and the front plate 416 are provided with a plurality of bolt holes adapted to receive the rods therethrough. The downstream ends 424 of the rods 422 are provided with threaded sections adapted to receive cooperating nuts 426.

Figure 13:
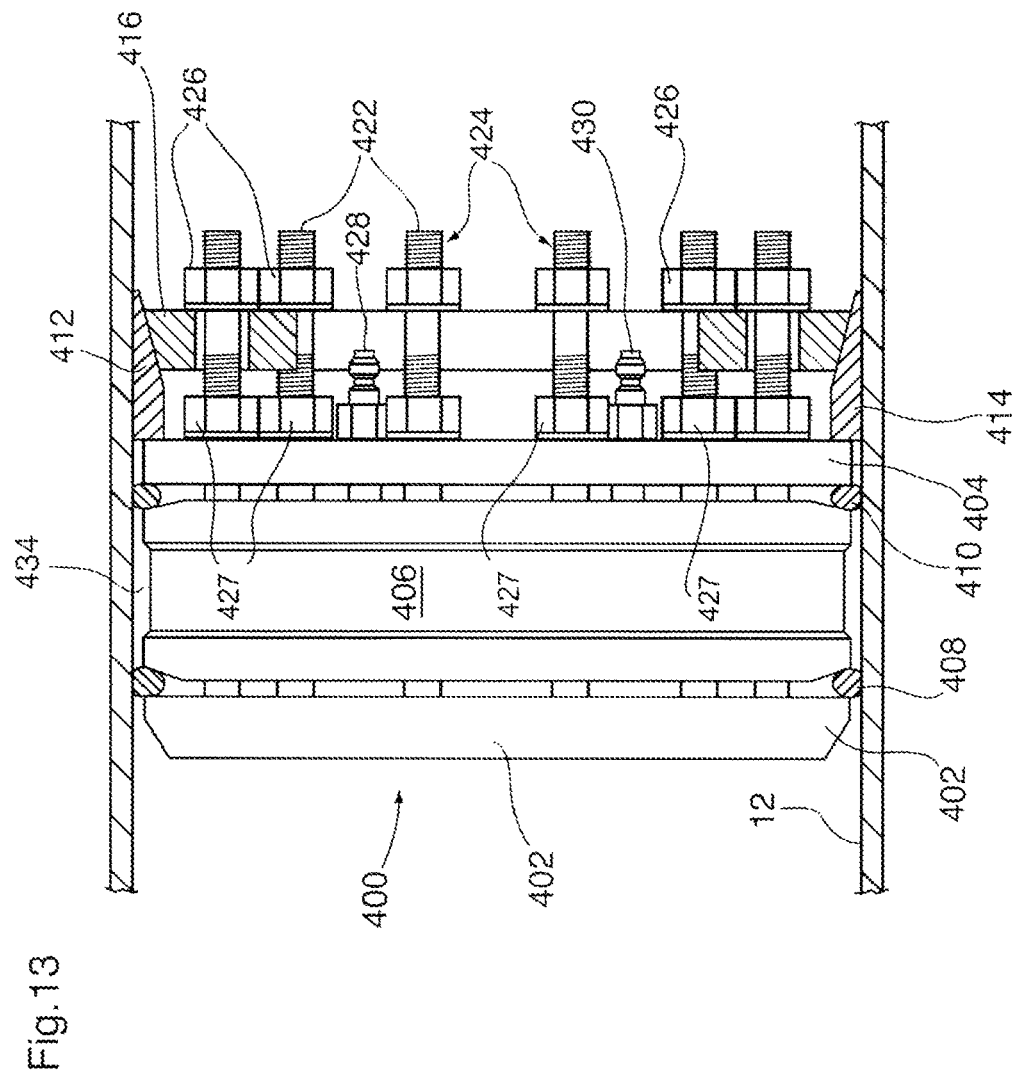

FIG. 13 illustrates a further embodiment where an additional set of nuts 427 are provided on the rods 422 wherein such nuts 427 are positioned to bear against the second boss 404.

Figure 14:
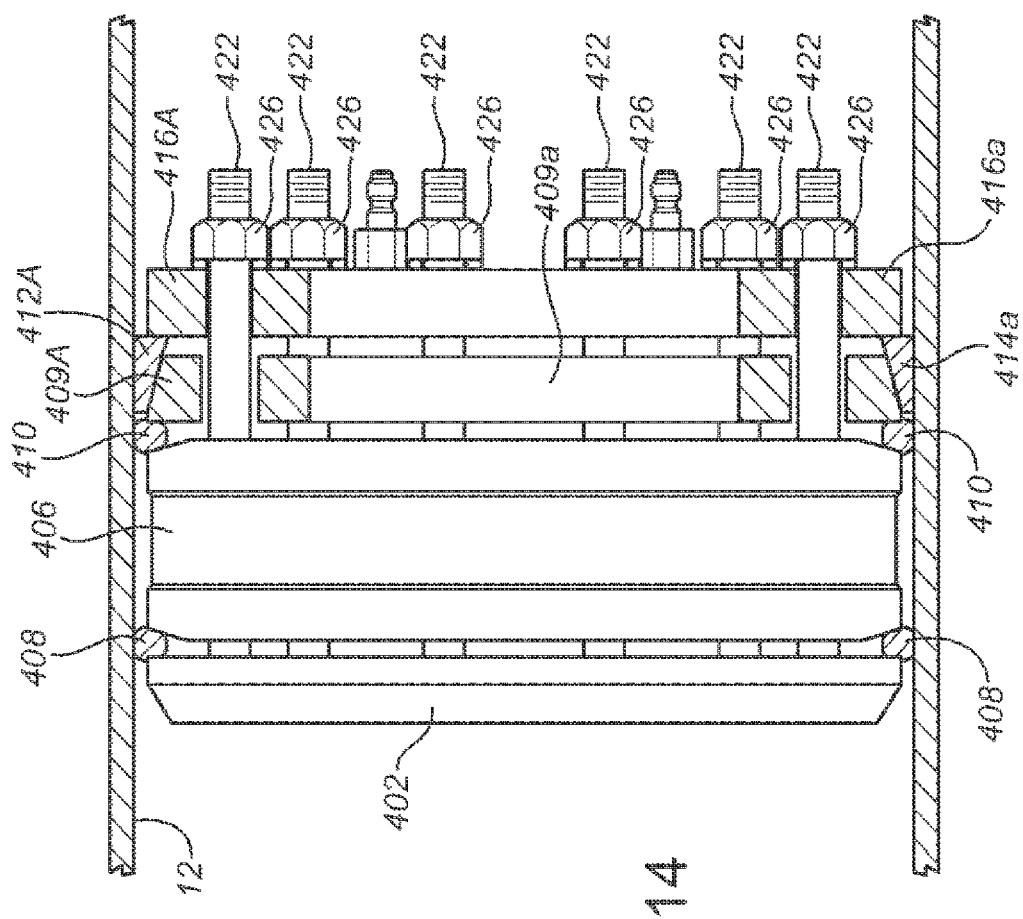
FIG. 14 is a partial cross sectional view of another embodiment of the invention incorporating pipe isolation and gripping mechanisms.
Figure 15:
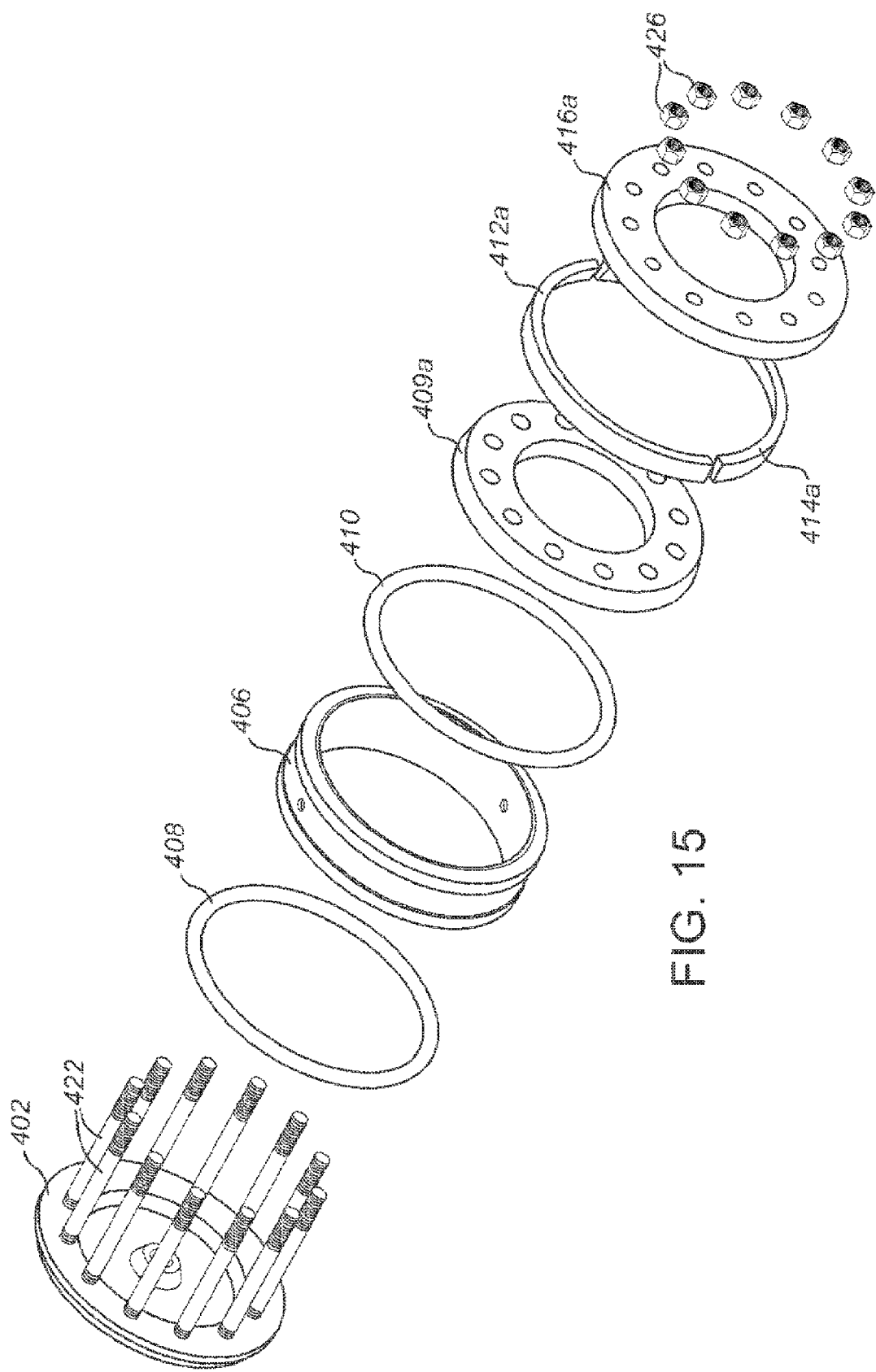
FIG. 15 is an exploded view of the device of FIG. 14.

As mentioned above, the bevels provided on shoes 412 an 414 may be provided on the upstream sides thereof. This embodiment is illustrated in FIGS. 14 and 15, wherein elements that are the same as those of other figures are shown with like numbers but elements that are similar but different are shown with like numbers along with the suffix "a". As shown in FIGS. 14 and 15, the various elements of the apparatus are essentially the same as those shown with respect to FIGS. 10-13. However, the shoes 412a and 414a are provided with a bevel on the upstream ends. Specifically, the thinner edges of the shoes 412a and 414a face upstream.

In this embodiment, the opposing bevel to those of the shoes 412a and 414a is provided on the second boss 404a. In this case, the front plate 416a would not require a bevel and, preferably, would not have one. As will be understood, with the arrangement shown in FIGS. 14 and 15, as the front plate 416a is advanced towards the second boss 404a, the shoes 412a and 414a are urged towards the second boss 406a and the arrangement of opposing bevels causes the shoes to move radially outwards to bear against the inner surface of the pipe 12. Although not shown in FIGS. 14 and 15, a second set of nuts, similar to nuts 427 shown in FIG. 13, may be provided between the second boss 404a and the front plate 416a.

In operation, the assembly 400 is preferably pre-assembled in a loose manner and inserted into the pipe 12. Once positioned in the desired location, the nuts 426 are tightened, thereby urging all elements of the assembly together. In the result, the sealing members 408 and 410 are deformed radially outwardly against the inner wall of the pipe 12. In this regard, it will be appreciated that the additional nuts 428 as shown in FIG. 13 would be preferred in order to first establish the seals formed by sealing members 408 and 410.

As will be understood, tightening of the nuts 426 in either of the embodiments of FIG. 10 or 13, will result in the front plate 416 urging the shoes 412 and 414 radially outward against the inner wall of the pipe 12. As discussed previously, such urging creates a gripping force between the shoes 412, 414 and the pipe inner wall, thereby serving to anchor the assembly 400 within the pipe. Alternately, with the embodiment shown in FIGS. 14 and 15, the upstream advance of the front plate 416a causes the shoes 412a and 414a to be pressed against the bevel provided on the second boss 406a and, similarly, creates a gripping force between the shoes 412a, 414a and the inner wall of the pipe 12.

Figure 11:
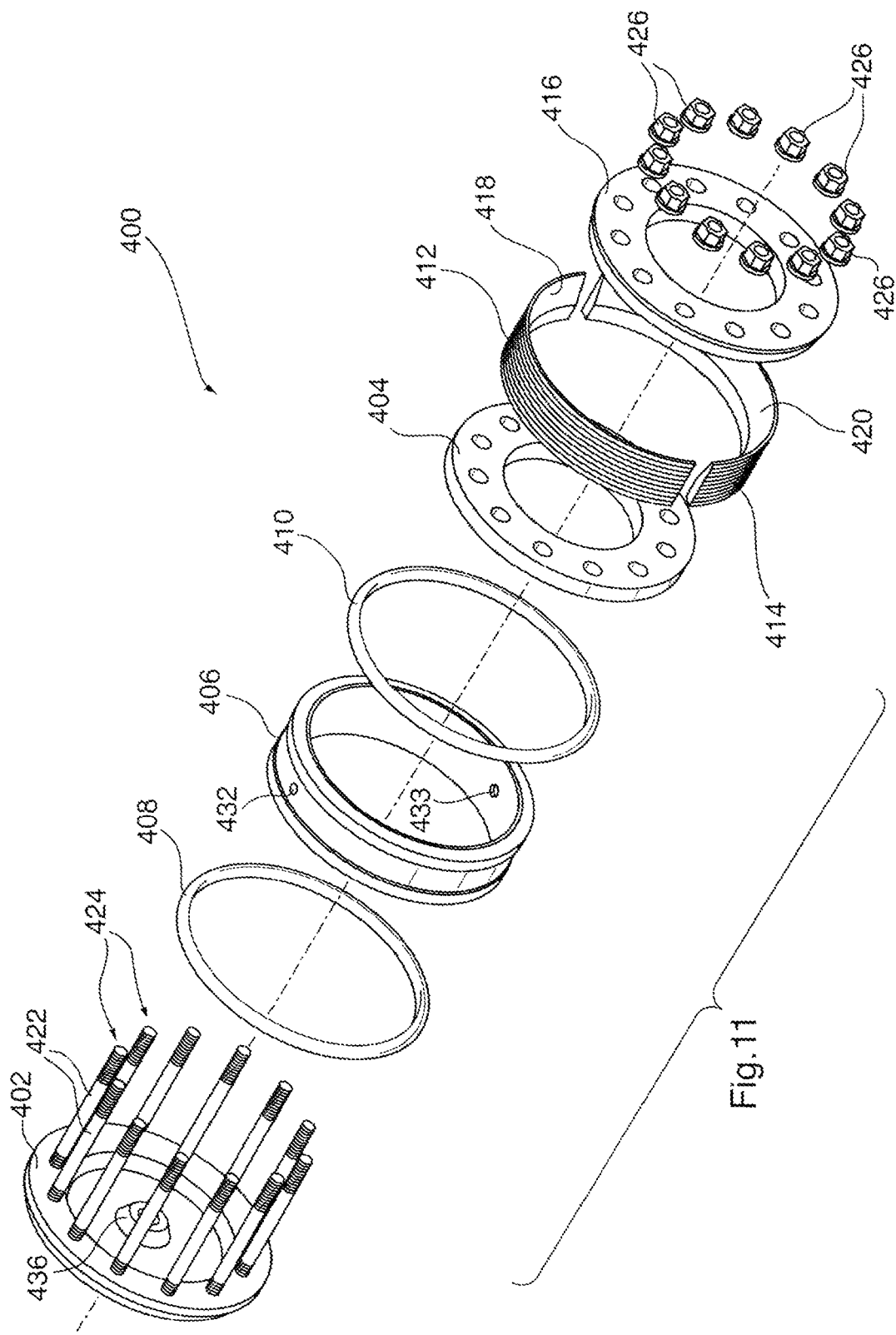
FIG. 11 is an exploded view of the device of FIG. 10.

The assembly 400 is also provided with at least one port, connected to the annular body 406. In the preferred embodiment, as discussed previously, the assembly 400 is provided with two ports shown as 428 and 430. The ports are fluidly connected to radially extending openings 432, 433 through the annular body 406, as shown in FIG. 11. The annular body 406 is provided with at least one portion that is of smaller outer diameter than the inner diameter of the pipe 12. In this way, when the assembly 400 is positioned and secured in place, an annular space is created bounded by the two sealing members 408, 410, the pipe inner wall, and the outer diameter of the annular body 406. Such annular space is shown at 434 in FIGS. 10 and 14. As will be understood, in such arrangement, the ports 428 and 430 are fluidly connected to the annular space 434 via the openings 432 and 433, respectively.

In operation, once at least the resilient sealing members 408 and 410 are secured in place, and preferably after the shoes or gripping plates 412, 414 are also secured, a pressurized fluid is introduced into one of the ports 428, 430. The other of the ports serves to vent air during the filling process. Such fluid then enters and fills the annular space 434. The pressure within the annular space 434 is then increased (by increasing the fluid pressure), thereby creating a further seal within the pipe as discussed above.

In a preferred embodiment a vent is provided through the assembly 400 for the same purpose as discussed above, namely to allow escape of any fumes etc. within the pipe on the upstream side of the assembly 400. As shown in FIGS. 11 and 12, in order to achieve such venting, the first boss 402 may be provided with an aperture 436, preferably at an axial centre thereof. The second boss 404 and the front plate 416 are preferably of an annular shape thereby avoiding the need for any vent hole etc. Although not shown, the assembly 400 may include a vent pipe connected to the aperture 436 to direct any vented gases, fumes etc. further downstream away from the assembly and any operators nearby. As discussed above, a valve may also be provided on such vent pipe whereby any venting is done only when the upstream pressure within the pipe 12 reaches a threshold value.

It will be understood that the "gripper" portion of the assembly 400 shown in FIGS. 10 to 13 can be used with any known plug, testing or isolation tool known in the art. In other words, since the "gripper" mechanism comprises the plurality of shoes or gripper plates, 412, 414 and the front plate, which forms the urging means for forcing the shoes against the pipe wall, these elements can be used in conjunction with, for example, the isolation tools described in U.S. Pat. Nos. 5,884,127 and 6,131,441. In such case, all that would be needed are the shoes 412, 414 and the front plate 416 and the nuts 426. This feature of the invention can be seen in FIG. 13. In this case, it can be observed that the isolation tool is formed with the bosses 402, 404, the sealing members 408, 410, the annular body 496 and the nuts 428. In such case, the gripper mechanism is formed by adding to such isolation too, the shoes 412, 414, the front plate 416 and the nuts 426. In this way, the gripper mechanism is "retrofitted" onto an existing isolation tool.

In a similar manner, the gripper mechanism can be incorporated onto any other plug or isolation assembly. In cases where tie rods are not available for receiving the front plate 416 and nuts 426, the necessary rods can be provided either temporarily or permanently on the downstream part of the plug. For example, such rods can be welded to the face of any known plug or isolation tool.

It will also be understood that apart from the above mentioned "retrofitting", it would similarly be possible to utilize the restraint devices shown in, for example, FIGS. 1 to 7 to provide the required "gripping" feature.

Although the invention has been described with reference to certain specific embodiments, various modifications thereof will be apparent to those skilled in the art without departing from the purpose and scope of the invention as outlined in the claims appended hereto. All examples provided herein are included solely for the purpose of illustrating the invention and are not intended to limit the invention in any way. All drawings provided herein are solely for the purpose of illustrating various aspects of the invention and are not intended to be drawn to scale or to limit the invention in any way.

We claim:

1. An assembly for insertion in the open end of a pipe for the purpose of closing and sealing the pipe's bore, the assembly having upstream and downstream ends and, when in use, comprising:
   a first upstream boss and a second downstream boss;
   an annular body positioned between the bosses, the bosses and annular body being axially aligned;
   first and second resilient, deformable, annular sealing members, wherein the sealing members are co-axially positioned, the first sealing member being positioned between the first boss and the annular body, and the second sealing member being positioned between the annular body and the second boss;
   an outer edge of one or both ends of the annular body, and an outer circumferential edge of the bosses comprising a bevel for receiving the sealing member, the bevels being positioned on one or both of the opposing faces of the bosses and annular body;
   a plurality of shoes positioned on the downstream side of the second boss;
   a front plate positioned downstream of the shoes and being coaxially positioned on the assembly, the front plate comprising a beveled outer diameter, wherein the outer diameter on the upstream side adjacent the shoes is the smallest, and the shoes comprising bevelled inner diameters, wherein the beveled inner diameters of the shoes face downstream and wherein the arrangement of bevels on the shoes and the front plate allows the front plate to slide over the downstream portions of the shoes;
   a plurality of tie rods connected with the first boss and sized and positioned to extend axially through the inner diameters of the first sealing member, the annular body, and the second sealing member, and to extend through the second boss and the front plate, wherein the second boss and the front plate comprise a plurality of bolt holes for receiving the tie rods therethrough, and wherein the downstream ends of the tie rods comprise threaded sections for receiving cooperating nuts;
   nuts for threadably engaging the tie rods on a side of the front plate opposite the shoes; and
   at least one port connected to the annular body;
   wherein tightening the nuts urges all elements of the assembly together and causes the sealing members to deform radially outwardly against the inner wall of the pipe, the deformation being directed by the bevelled edges of the bosses and the annular body, thus creating an annular space bounded by the sealing members, the inner wall of the pipe, and the outer diameter of the annular body; and
   wherein tightening the nuts causes the front plate to urge the shoes radially outward against the inner wall of the pipe, thereby creating a gripping force between the shoes and the inner wall of the pipe, and serving to anchor the assembly within the pipe.

2. The assembly as set forth in claim 1, wherein the first boss comprises an aperture at an axial center of the first boss.

3. The assembly as set forth in claim 2, wherein the assembly comprises two ports fluidly connected to radially extending openings through the annular body, and fluidly connected to the annular space via the openings.

* * * * *